UNITED STATES PATENT OFFICE.

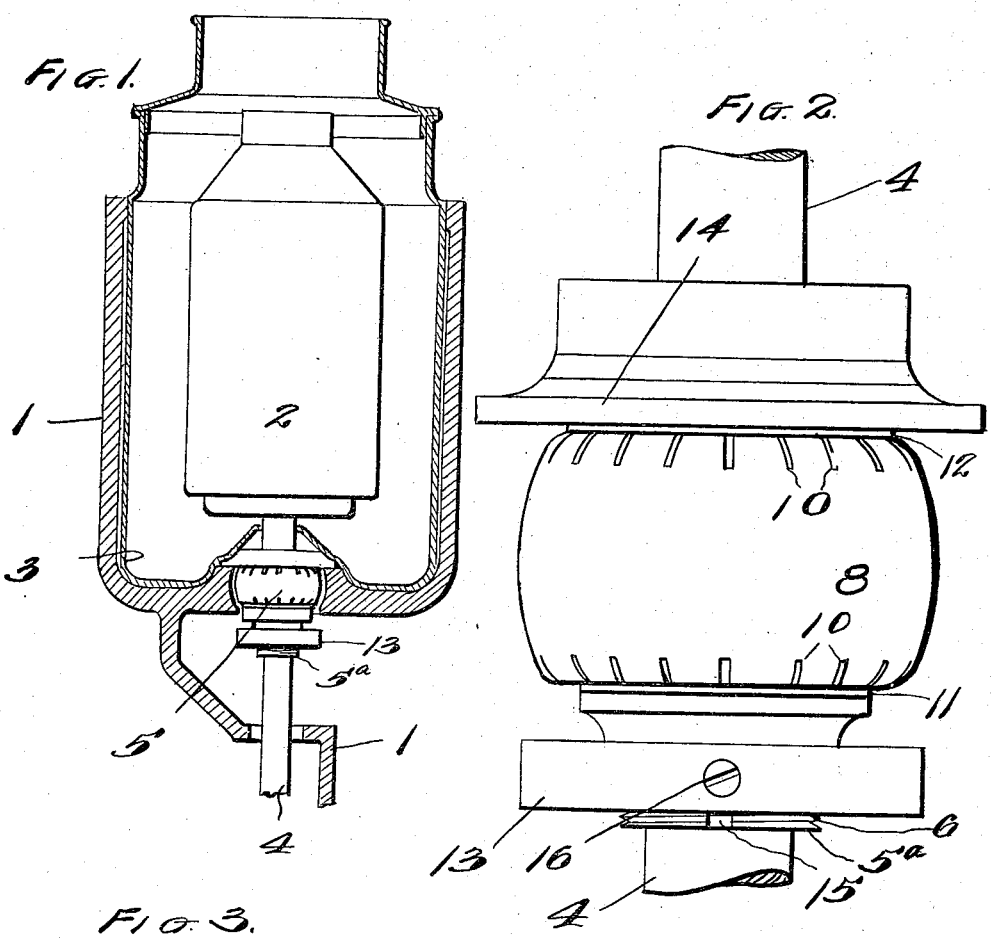
D. A. JONES.
JOURNAL BEARING.
APPLICATION FILED SEPT. 9, 1915.
1,170,271.
Patented Feb. 1, 1916.
2 SHEETS—SHEET 1.
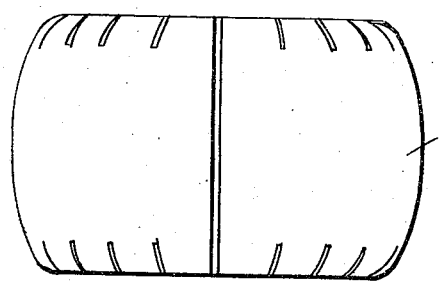
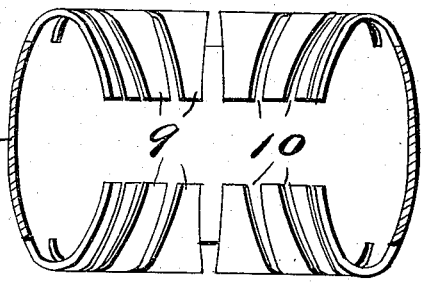
Witness
C. K. Davies
Inventor
DANIEL A. JONES.
By Herman A. Phlipp
Attorney

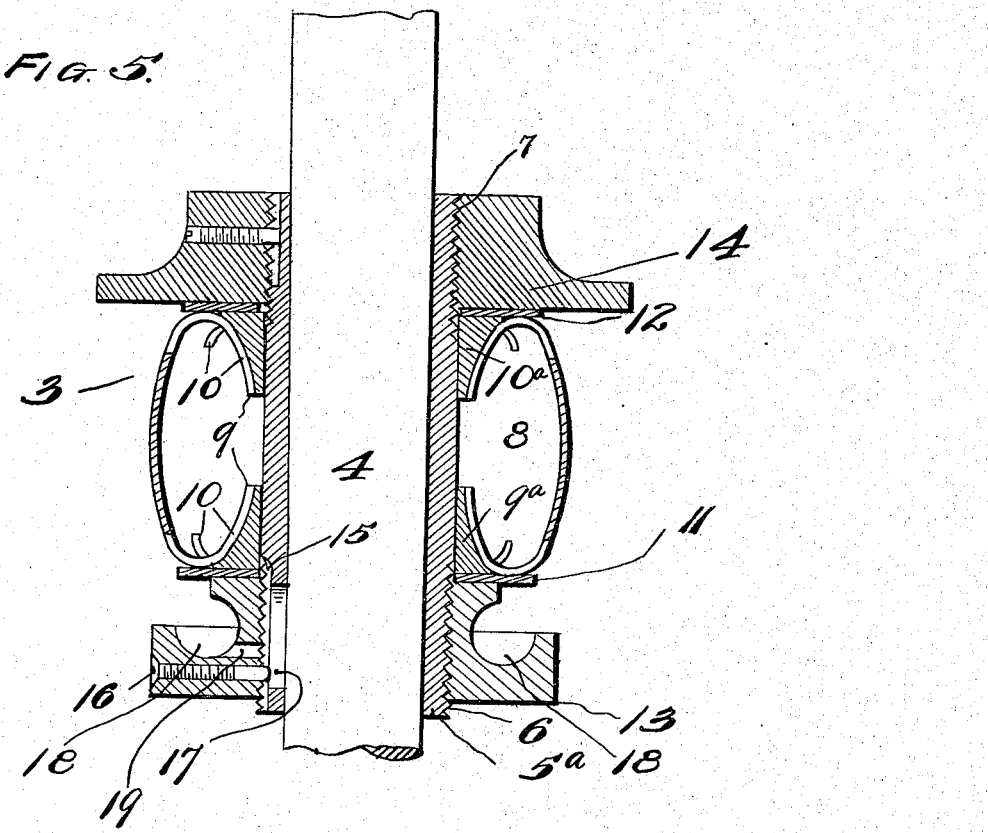

DANIEL A. JONES, OF DURAND, MICHIGAN.

JOURNAL-BEARING.

1,170,271. Specification of Letters Patent. Patented Feb. 1, 1916.

Application filed September 9, 1915. Serial No. 49,721.

*To all whom it may concern:*

Be it known that I, DANIEL A. JONES, a citizen of the United States of America, residing at Durand, in the county of Shiawassee, State of Michigan, have invented new and useful Improvements in Journal-Bearings, of which the following is a specification.

The present invention relates to improvements in journal bearings of the wear compensating type, and the invention is hereinafter embodied and illustrated in connection with the "neck bearing" of a revoluble cream separator.

The primary object of the invention is to provide a bearing of the type especially applicable for steadying the bowl of the separator while it is getting up speed, or while it is running down from high speed. If the machine is standing level and the bowl is symmetrically supported when running at full speed, the bowl is balanced on its spindle point, and does not in fact rest upon its "bearing" proper. If, however, the machine is not absolutely level while in use, the bearing is required to perform the function of supporting the bowl during the operation of the separator, and the performance of this function causes the bearing to wear. By the utilization of my improved construction, I am enabled to provide a flexible supporting bearing which is adapted to adjust itself to the motion of the bowl without vibration.

The invention consists in certain novel combinations and arrangements of parts as hereinafter set forth, and particularly described in my appended claims.

In the accompanying drawings I have illustrated one complete example of the physical embodiment of my invention constructed according to the best mode I have so far devised for the practical application of the principles of the invention.

Figure 1 is a sectional view of so much of the bowl, bowl chamber, and bowl neck bearing as is required to give an idea as to the application of my invention. Fig. 2 is an enlarged detail elevation of the bearing. Fig. 3 is a detached side elevation of the flexible resilient or spring collar of the bearing. Fig. 4 is a cross section of the spring collar. Fig. 5 is a vertical sectional view of the bearing of Fig. 2. Fig. 6 is a sectional view of an upper adjusting wedge ring. Fig. 7 is a sectional view of a lower adjusting wedge ring. Fig. 8 is a sectional view of a lock nut for securing the bearing ring or sleeve.

In illustrating my invention I have utilized the bowl chamber 1, in which the bowl 2 is supported, and the bowl lining 3 is illustrated within the chamber 1. The "neck bearing" or journal bearing of my invention is used in connection with the revoluble spindle 4 which is utilized to rapidly revolve the bowl 2, and the invention resides particularly in the neck bearing which is indicated in Fig. 1, as a whole, by the numeral 5. In connection with the spindle 4, I employ a bearing sleeve $5^a$ of suitable material, and threaded at its lower end 6 and at its upper end 7. These parts are located within an opening in the bottom of the bowl chamber 1, and the bearing sleeve is adapted to steady the bowl 2, which is supported upon and revolves with the spindle 4, as usual.

A flexible supporting spring collar 8 is illustrated as surrounding the bearing sleeve $5^a$, and this collar is provided at its inner side with a series of tongues 9 which are formed by cutting the slots 10 in the body of the metal, in order to give flexibility and resiliency to the collar. The collar is adapted to take the weight or load of the bowl, and is provided with a lower wedge ring $9^a$ and an upper wedge ring $10^a$, which are interposed between the separated tongues 9 of the ring, and the bearing sleeve $5^a$, as clearly seen in Fig. 5.

Below the ring $9^a$ a washer 11 may be interposed and above the ring $10^a$ a second washer 12 may be utilized as antifriction members, and to compensate for wear. The resiliency of the support afforded the bowl may be regulated and adjusted by means of a lock nut 13 at the lower end of the bearing and a lock nut 14 at the upper end of the bearing. The nut 13 is screwed to the threaded end 6 of the bearing sleeve $5^a$, and is adapted to force upwardly the lower end of the spring collar, while the lock nut 14 is adapted to force down the upper end of the spring collar. That is, the tongues 9 of the spring collar, which are resilient, may be squeezed toward each other, so that the altitude of the spring collar may be decreased as desired to form a bearing which will steady the spindle and its bowl and be resilient, and yet not be of sufficient rigidity to cause the bearing to be subjected to excessive wear.

The bearing ring or sleeve is provided with a number of grooves 15 spaced at regular intervals about its lower end, any one of which may be engaged by the set screw 16 in the lock nut 13 to prevent the nut from revolving on the bearing sleeve. These grooves 15 are also utilized as shown in Fig. 5, to provide lubricating slots 17 which communicate with the oil chamber 18 through the passage 19 in the lock nut 13. In this manner oil may be continuously fed through the horizontal slots 19 and vertical slots 17 to the spindle 4.

From the above description, taken in connection with my drawings, it is apparent that I have provided a bearing of this character which may be readily adjusted as to its resiliency in supporting the bowl, and which may also be well and freely lubricated, and which performs its functions in an efficient and economical manner, and which is easy in its operation.

What I claim is:

1. The combination with a spindle and its slotted bearing sleeve having threaded ends, of a resilient member, and lock nuts on the sleeve adapted to adjust the resiliency of said member and one of which is slotted and provided with an oil chamber communicating with the slotted bearing sleeve.

2. The combination with a spindle and its bearing sleeve, of a hollow metal collar formed with inwardly bent resilient oppositely disposed tongues, a pair of wedge rings between said tongues and the bearing sleeve, and means above and below the collar for compressing said resilient tongues.

In testimony whereof I affix my signature.

DANIEL A. JONES.

Copies of this patent may be obtained for five cents each, by addressing the "Commissioner of Patents, Washington, D. C."